US011345539B2

(12) United States Patent
Strong

(10) Patent No.: US 11,345,539 B2
(45) Date of Patent: May 31, 2022

(54) TRANSPORT CONTAINER

(71) Applicant: REFLEX MARINE LTD, Cornwall (GB)

(72) Inventor: Philip Anton Strong, Bristol (GB)

(73) Assignee: REFLEX MARINE LTD, Cornwall (GB)

(*) Notice: Subject to any disclaimer, the term of this patent is extended or adjusted under 35 U.S.C. 154(b) by 121 days.

(21) Appl. No.: 16/609,002

(22) PCT Filed: Apr. 27, 2018

(86) PCT No.: PCT/EP2018/060882
§ 371 (c)(1),
(2) Date: Oct. 28, 2019

(87) PCT Pub. No.: WO2018/197672
PCT Pub. Date: Nov. 1, 2018

(65) Prior Publication Data
US 2020/0055668 A1 Feb. 20, 2020

(30) Foreign Application Priority Data
Apr. 28, 2017 (EP) .................................. 17382229

(51) Int. Cl.
B62B 5/00 (2006.01)
B63C 9/06 (2006.01)
(Continued)

(52) U.S. Cl.
CPC .............. B65D 90/02 (2013.01); B62B 3/002 (2013.01); B62B 5/0006 (2013.01); B63B 27/30 (2013.01);
(Continued)

(58) Field of Classification Search
CPC ....... B65B 27/10; B65B 27/00; B65D 81/053; B65D 88/005
(Continued)

(56) References Cited

U.S. PATENT DOCUMENTS 7,556,471 B1 7/2009 Sean
10,099,757 B2 * 10/2018 Strong .................... B63B 23/38
(Continued)

FOREIGN PATENT DOCUMENTS

DE 20 2010 006108 U1 9/2010
EP 2 123 552 A1 11/2009
EP 2 222 529 A1 8/2011

OTHER PUBLICATIONS

International Search Report dated Jun. 6, 2018 in connection with International Application No. PCT/EP2018/060882.
(Continued)

Primary Examiner — Anthony D Stashick
Assistant Examiner — Raven Collins
(74) Attorney, Agent, or Firm — Kramer & Amado, P.C.

(57) ABSTRACT

Container adapted for cargo or personnel transport, the container being substantially prismatic, cylindrical or cubic in shape, wherein the container comprises: an internal surface and an external surface, a rigid frame, which defines a plurality of container faces, wherein the confluence of two or more of said container faces define edge portions being substantially chamfered, and one or more shock absorbing corner protectors adapted for being mounted on the edge portions, characterized in that the edge portions of the rigid frame comprise one or more beams arranged substantially in parallel to the direction of the confluence of two container faces, and the inner face of the corner protectors comprise at least a flange adapted for fitting in the one or more beams of
(Continued)

the edge portions, such that the corner protectors substantially protrude from the external surface.

11 Claims, 6 Drawing Sheets

(51) Int. Cl.
*B65D 90/00* (2006.01)
*B65D 90/18* (2006.01)
*B65D 88/00* (2006.01)
*B65D 81/05* (2006.01)
*B65D 81/02* (2006.01)
*B65D 90/02* (2019.01)
*B62B 3/00* (2006.01)
*B63B 27/30* (2006.01)
*B63B 27/16* (2006.01)

(52) U.S. Cl.
CPC .............. *B63C 9/06* (2013.01); *B65D 81/053* (2013.01); *B65D 88/005* (2013.01); *B65D 90/0033* (2013.01); *B65D 90/18* (2013.01); *B63B 27/16* (2013.01); *B65D 81/022* (2013.01); *B65D 90/0026* (2013.01); *B65D 2590/0066* (2013.01)

(58) Field of Classification Search
USPC ........................................................... 220/1.5
See application file for complete search history.

(56) References Cited

U.S. PATENT DOCUMENTS 10,118,675 B2 * 11/2018 Strong .................... B63B 27/16
2006/0181845 A1 * 8/2006 Shah ....................... G11B 33/12
361/679.4

OTHER PUBLICATIONS

Notification of Transmillal of the International Preliminary Report on Patentability dated Jul. 2, 2019 in connection with PCT/EP2018/060882.
Written Opinion of the International Searching Authority dated Jun. 6, 2018 in connection with PCT/EP2018/060882.

* cited by examiner

TRANSPORT CONTAINER

TECHNICAL FIELD OF THE INVENTION

The present invention belongs to the field of cargo or personnel containers and, more particularly, to the field of containers to be used in marine operations during harsh weather.

In ordinary operation of cargo in marine conditions, for instance in a calm day, the hoisting and lifting up of cargo containers to be translated from vessels to working stations or vice versa, are performed safely for both surroundings and the integrity of the assets. Nevertheless, there are some critical scenarios where cargo operation is prone to failure posing some problems arisen.

The more common critical scenario operating in marine conditions is harsh weather in particularly relating to the sea-state or wave conditions. Such weather can cause pronounced motions to the vessel in all degrees for freedom. Lifting cargo from a deck of such a vessel, using a crane mounted on a separate structure, fixed or floating, means that the lifting operations are subjected to high relative motions, which can create dangerous conditions and excessive relative motions of the cargos when lifted. Operations are therefore normally only performed within a restricted safe operating weather window.

The cargo operation in marine conditions should be understood as moving containers, machinery or tools from a vessel or boat to a platform or other structure in open water. To do so, a wide range of lifting elements may be used depending on the type of assets to be transported.

In general, three key questions are taken into account when operating cargo in open water: the weight, safety and operating envelope:

standard containers are heavy resulting in a low payload/ net load ratio, also limiting the payload that can be transferred by cranes and vessels; moreover, mass in motion can be dangerous and cause several damage, heavy loads are difficult to control, and stiff aggressively shaped corners that can put crews at risk and cause severe damage to assets when working in restricted spaces, and finally, delays can be caused due to restricted operating envelopes depending on the weather, limited load capacity of cranes, potential damage to assets and spillages or incidents hence impacting in overall performance.

Therefore, there is a need in the field of cargo operations to accomplish safe transporting and handling both for crew and any other element in the surroundings when the operating scenario is out of the conventional safe operating envelope, i.e. in harsh weather in open water.

Document EP 2 123 552 A1 discloses a device for transferring persons at sea. Document DE 20 2010 006108 U1 describes a shock-absorbing protective device which is arranged at the edges of a tool carriage or box and thus ensures a shock-absorbing function. Document EP 2 222 529 A1 describes an angle protection for shopping carts and method for making same. Document U.S. Pat. No. 7,556, 471 B1 relates to methods and devices for transferring people between marine vessels and/or other marine structures while at sea.

SUMMARY OF THE INVENTION

The present invention provides an alternative solution for the aforementioned problems, by a container adapted for cargo or personnel transport according to claim 1. In dependent claims, preferred embodiments of the invention are defined.

In an inventive aspect, the invention provides a container adapted for cargo or personnel transport, preferably in marine operations, the container being substantially prismatic, cylindrical or cubic in shape, wherein the container comprises:

an internal surface and an external surface, a rigid frame, which defines a plurality of container faces, wherein the confluence of two or more of said container faces define edge portions, wherein one or more of the edge portions are substantially chamfered, and one or more shock absorbing corner protectors adapted for being mounted on the edge portions, wherein the corner protectors comprise an inner face and an outer face, characterized in that the edge portions of the rigid frame comprise one or more beams arranged substantially in parallel to the direction of the confluence of two container faces, and the inner face of the corner protectors comprise at least a flange adapted for fitting in the one or more beams of the edge portions, such that the corner protectors substantially protrude from the external surface.

Throughout all this document, the internal surface of the container will be understood as the inside part of the container defined by all the container faces; and the external surface of the container as the part of the container exposed to the weather conditions.

Throughout this entire document, rigid frame will be understood as any structural frame able to withstand loads or impacts and to be used as a support for the cargo or assets contained. By this definition, any form or arrangement of structural elements may fall into that, such as:

several panels arranged together and fastened by any means comprising a polyhedron; or in the event of a cylindrical container, the rigid frame comprises two substantially circular continuous or discontinuous frames joined by distributed beams or by a continuous or discontinuous face.

Additionally, such structural elements, in any of the mentioned configurations, may be comprised exclusively or partially by individual elements forming thereby open spaces or windows on the container faces.

Also, throughout this entire document, the confluence of two or more of the container faces defining edge portions will be understood as corners of the cylindrical or polyhedral container. In addition, the chamfered portions should be understood as the portions extending along part or the whole length of the edge portions. The chamfered portion may not be constant along the entire edge portions, i.e. the chamfer may be deeper in some partial sections than other depending on the protector to be mounted.

Advantageously, the present container better manages high side impact loads and reduces the risks of damaging both the assets contained in the container and the surroundings when working in harsh sea operations. By the combination of a rigid frame supporting the structure and energy absorbing elements, such as the corner protectors, located in those areas likely to be impacted during cargo or personnel transfers, the protection against unexpected impacts of the rigid frame is equal or better, even with a lighter weight, because the rigid frame does not need to withstand such impacts alone.

The contrast of a rigid frame, inherently heavy and stiff, on one side and corner protectors, inherently lighter and shock absorbing, on the other allows spacing apart the dual functions of prior rigid frames which were designed to withstands impacts and loads, while supporting the assets. Thus, a collateral advantage of such design is that the container is lightweight because the weight of the rigid frame may be less than prior container even adding the weight of the corner protectors.

The container comprises corner protectors that depending on the manufacturing material used; behaves partially as elastic and partially as an energy dissipation protector, thus becoming shock absorbing and recovering its original shape. This shape recovering function ("memory function") is maintained after repeated (frequent) impacts, like those found in marine operations.

The elastic function should be understood as the material strains when stretched and quickly return to their original state once the stress is removed. Otherwise, the energy dissipation function allows converting the energy of the impact into another source of energy during deformation (both by absorbing such energy and/or dissipate it to outside). In this sense, the energy dissipation function may be understood as a resilient material.

In a particular embodiment, the corner protectors comprise two parts, a core and a skin; wherein the skin is manufactured with a flexible material able to withstand marine conditions. Preferably, the material of the core and the skin is the same.

In another particular embodiment, the one or more shock absorbing corner protectors comprise a flexible foam core, wherein the flexible foam has shape memory.

This flexible foam material comprises the following behaviors:
behaves partly elastically with a shape recovering function ("memory function"),
behaves partly as energy dissipation material, and
behaves distributing stresses from impacts.

Advantageously, this flexible foam material is a soft, energy absorbing material which distributes stresses into the rigid frame effectively while deforming, at the same time that recovers its original shape after an impact. Preferably, the flexible foam material is polyurethane foam.

In another embodiment, the one or more shock absorbing corner protectors comprise a elastomeric material adapted for absorbing impact energy and distributing the associated impact stresses on the rigid frame. Preferably, the elastomeric material is rubber.

Advantageously, when there is an impact on the corners, the impact energy is absorbed more effectively by this material.

Hence the highest impact forces may be absorbed by the corner protectors being temporarily deformed and distributing the loads over a larger section of the corner protector and rigid frame.

The corner protectors are placed in those points where impacts are most likely to occur and also reduce the risk of serious injury to people involved in the cargo transfers, i.e. vessel deck crews, and protecting the rigid frame itself and the assets contained.

The result is that the frame could be lighter, because the highest impact forces will be softened by the protectors. This will retro feed, because a lighter container will also have lower impact forces. These forces will be impacting on temporarily deforming the shape of the corner protectors where they concentrate the most, so the risk to people around being struck or trapped by the container should be greatly reduced. In addition, by reducing the weight of the overall structure, the mass motion is reduced and thus the potential damage by impacting the surroundings assets is reduced.

Moreover, by sizing and matching the overall configuration of the container to both the most critical harsh weather condition and the assets to be transported, the safe operating envelope can be stretched.

In a particular embodiment, the container comprises two beams on one or more edge portions. These two beams are preferably arranged in both laterals of the chamfered edge portion.

Advantageously, these beams allow placing an energy absorbing element on the most loaded zones when an impact is produced. Additionally, they act as an attachment point for the flanges.

In another particular embodiment, the at least one flange of the corner protectors comprises one or more flange protrusions configured to self-lock the entire corner protector on the one more beams.

By this configuration, the one or more flange protrusions of the at least one flange need to be resistant enough as to avoid the detaching of the entire corner protector during the whole operation.

The corner protectors are therefore able to be self-locked into the frame, with no requirement for mechanical fasteners. Advantageously, this reduces cost and also avoids high stresses (week points) around such hypothetical fasteners.

By this self-locking function, the flange protrusions protrude inclined towards the beams partially surrounding them. In the event two beams are considered, the flange protrusions protrude divergently from an inner section of the inner face of the corner protectors. Another configuration may be that the flange protrusions converge from the outer sections of the inner face of the corner protectors.

In the case of divergently protruding flange protrusions, the middle space between flange protrusions may be filled out. This allows an internal protection to the contained assets, preferably when the containing assets are personnel.

In another particular embodiment, the container further comprises two or more corner protectors, wherein the corner protectors are identical.

Advantageously, this allows a better stabilization of the container during lifting up or hoisting due to the balanced weights.

In another particular embodiment, the container is substantially rectangular prismatic, comprising a top container face, a bottom container face and four side container faces. Preferably, the container has a quadrangular prism shape wherein the top and bottom faces are the bases.

In another particular embodiment, the container comprises four corner protectors begin each positioned on one edge portion defined by the side container faces.

Advantageously, this configuration allows a weight reduction by a smaller number of corner protectors placed only in those areas likely to be impacted during cargo/personnel operation, even when harsh weather conditions produce winds and rains moving laterally the container during hoisting or lifting up.

In another particular embodiment, the angle formed by the flange protrusions and the inner face of the corner protectors is larger than 0° and smaller than 90°. In this embodiment, the inner face of the corner protector corresponds to the inner face of the chamfered edge portions.

Advantageously, this allows different attachment types with the beams, and may retrofit among different beam sizes.

In another particular embodiment, the corner protectors are substantially elongated.

Advantageously, this allows a wider protection zone along the edge corners, and the corner protectors may stretch to the entire edge portion or only partially depending on those zones likely to be impacted. This allows a weight reduction.

In a particular embodiment, the corner protectors comprise a substantially circular cross-section.

In a preferred embodiment, the corner protectors comprise a substantially polygonal cross-section. The particular shape is defined by the impact direction most likely to occur depending on the particular operation envisaged. This feature, together with the locking system of the flanges, allows that different corners protectors can be interchanged depending on the operation environment.

Preferably, the angles formed by the sides of the polygonal cross-section of the corner protectors are larger than 0° and smaller than 180°. More preferably, the lateral sides of the polygonal cross-section extend perpendicularly, from the corresponding lateral of the chamfered edge portions, to each container side configured to form the edge portion. It may be understood that the sides of the polygonal cross-section of the corner protector form the specific angle, when the connection between two consecutive angles may form a rounded angle.

In a particular embodiment, the thickest part of the corner protectors is oriented substantially perpendicular to the chamfered face of the edge portions.

This thickest part is identified as the most massive part, and corresponds to maximum thickness of the corner protector being measured by the distance between:
 the plane defined by the chamfered edge portion, and
 a plane parallel to latter and tangent to the corner protector.

In a preferred embodiment, the corner protectors comprise substantially beveled ends, adapted for avoiding the snagging on adjacent obstacles during hoisting or lowering or any interposed element or structure in the direction of hoisting. This technical feature allows avoiding an incident of the container operation to be snagged with any additional element used during hoisting or lifting up.

In a particular embodiment, the container further comprises one or n lifting eyes on the container faces. In a preferred embodiment, the container further comprises one or more access openings adapted for accessing said lifting eyes.

Throughout this entire document, a lifting eye will be understood as any attaching element arranged on any of the internal or external surface of the container, and being configured to attach a lifting mechanism such as a rope with a pole, a guiding rod or any other element suitable for hoisting the container mechanically. Examples of equivalent lifting eyes may be hooks, lockable latches or any others with the same function.

In an embodiment, the rigid frame comprises single-part structural elements joined between them by mechanical attachment means.

In the entire specification, a mechanical attachment means should be understood as a conventional fastener such as a bolt, a pin, a rivet and/or any other hardware device that mechanically joins or affixes two or more objects together by creating non-permanent joints; that is, joints that can be removed or dismantled without damaging the joined components.

Throughout this entire document, a single-part structural element will be understood as the element is manufactured as a single piece without any welding joint. Advantageously, this allows reducing the corrosion caused by long-exposures in maritime conditions, and also welded parts are less resistant to high loads than integral or single piece elements. The structural elements will distribute the loads by the critical paths, avoiding thus welded portions.

In a particular embodiment, the container further comprises two or more wheels on the bottom container face. Advantageously, this allows displacing the container over the vessels or the working stations using the container as a trolley for horizontal displacement.

In a particular embodiment, the container comprises detachable or modular boxes adapted to storage items.

Advantageously, this modular configuration allows a better organization of the space available within the container and, thus, take advantage maximize the space utilization. By labeling the purpose of any module, a quicker and better use and storage of equipment and items within the container is achieved.

In a particular embodiment, the container further comprises a collapsible lifting point anchor suitable for hoisting or lifting up the entire container by a single point when the collapsible lifting point anchor is positioned in the non-collapsed position.

Advantageously, this allows a quick hooking for rapid operation in sea environment. Moreover, in the event the container is not used, the collapsible lifting point anchor is positioned in the non-collapsed position occupying a space similar to the previous container with conventional lifting eyes. The collapsible lifting point anchor may be collapsed manually to the collapsed position. In a more particular embodiment, the container may comprise both the lifting eyes of the previous embodiment and the collapsible lifting point anchor.

In another particular embodiment, the collapsible lifting point anchor is detachable, being joined by mechanical attachment means.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Container (1)

Figure 1:
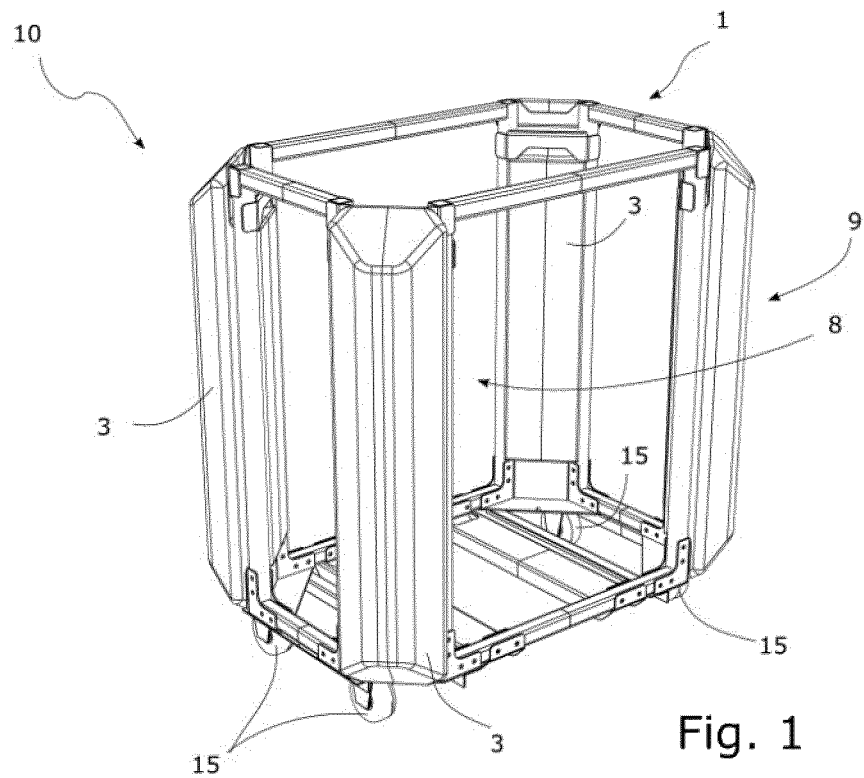
FIG. 1 This figure shows a container according to an embodiment of the invention.

FIG. 1 shows a container (10) comprising:

an internal surface (8) and an external surface (9), a rigid frame (1), which defines a plurality of container faces (11), wherein the confluence of two or more of said container faces (11) define edge portions (2), wherein one or more of the edge portions (2) are substantially chamfered, and one or more shock absorbing corner protectors (3) adapted for being mounted on the edge portions (2), wherein the corner protectors (3) comprise an inner face (4) and an outer face (5), The edge portions (2) of the rigid frame (1) comprise one or more beams (7) arranged substantially in parallel to the direction of the confluence of two container faces (11).

By this configuration, there is a synergetic contrast between, a soft material able to absorb impacts, and a rigid material able to withstand loads and support the assets contained within the container (10).

In a particular example, the container (10) comprises four edge portions (2), wherein each edge portion comprises two beams (7) configured to mount a corner protector (3).

Figure 6A:
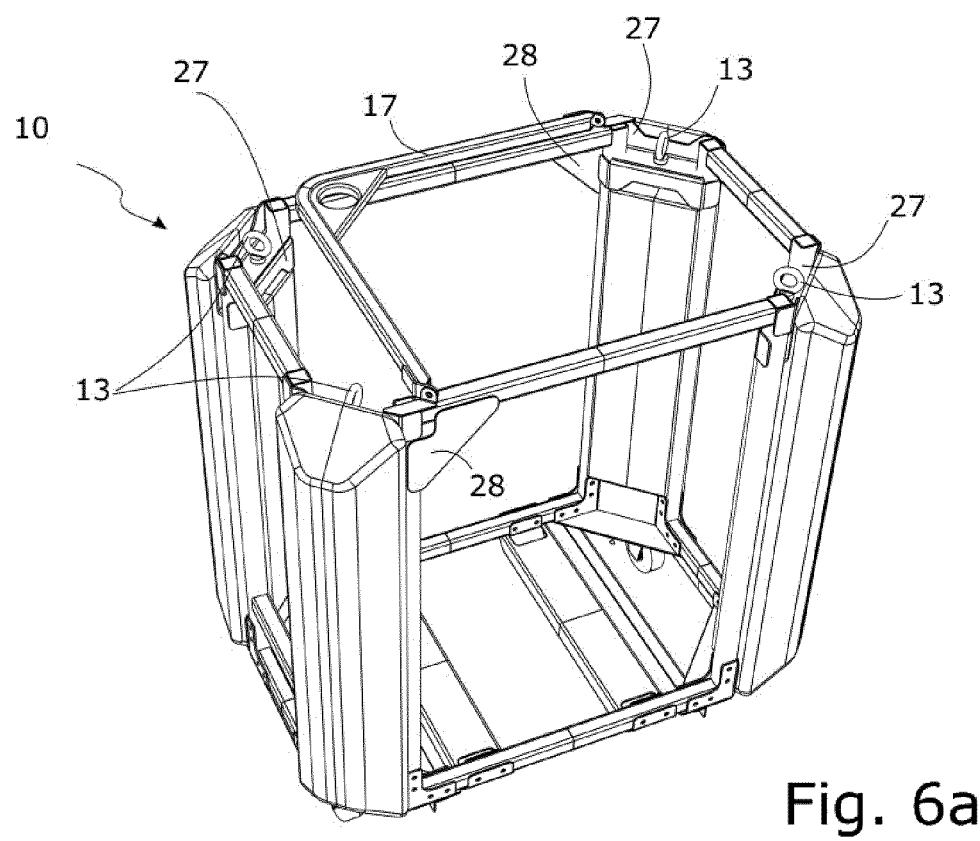
FIGS. 6a-6b These figures show a particular embodiment of the container comprising a collapsible lifting point anchor, in the non-collapsed position and collapsed position.
Figure 6B:
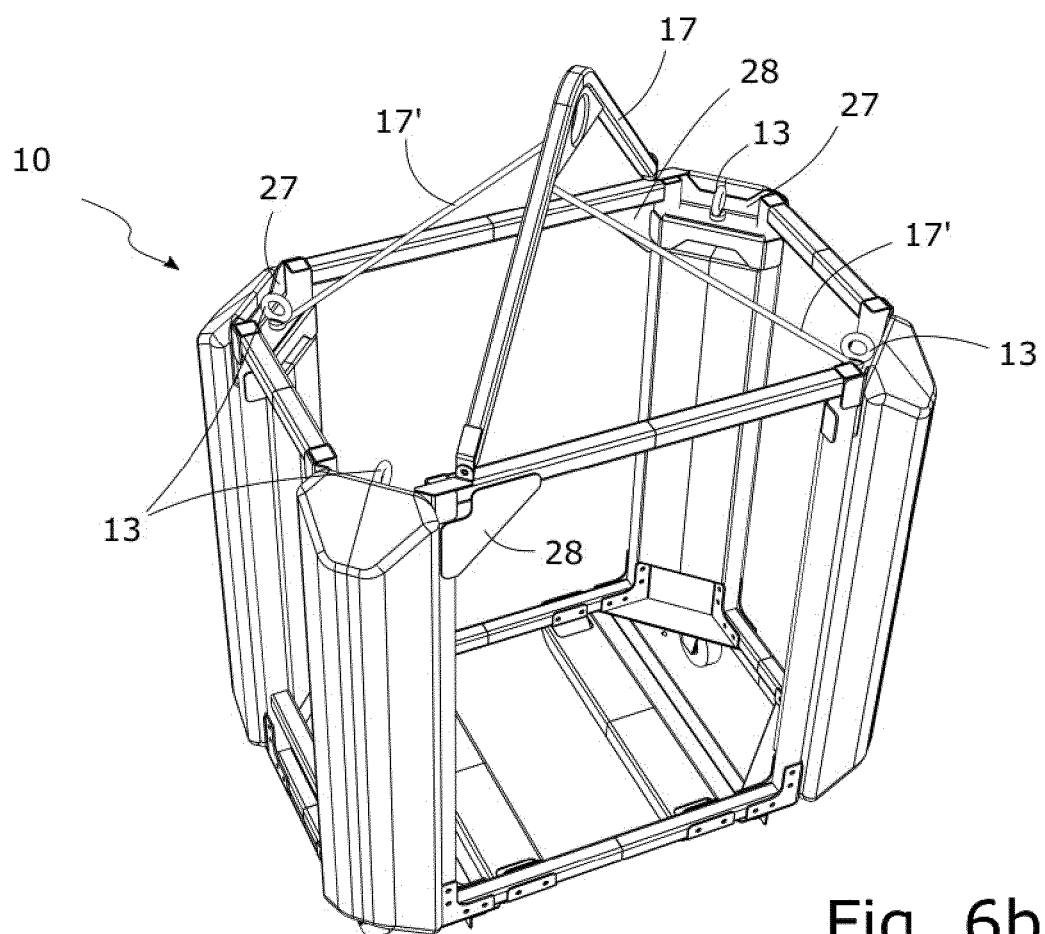

Furthermore, the container comprises lifting eyes (13) arranged on the container faces (11) as can be seen on FIG. 6a-6b. Particularly, said lifting eyes (13) are arranged on the top container face (11). More particularly, the container comprise one or n lifting eyes (13) depending on the weight of the assets and the weight of the container (10) itself.

Optionally, the container (10) further comprises two or more wheels (15) on the bottom container face (11) adapted to move horizontally the container on a surface. In the event the container has only one or two wheels (15), and no stable position is gotten, there is a need of an additional leg (not shown) to stabilize the container (10) on such surface. In the embodiment shown in FIG. 1, the container (10) comprises four wheels (15).

Rigid Frame (2)

Figure 2:
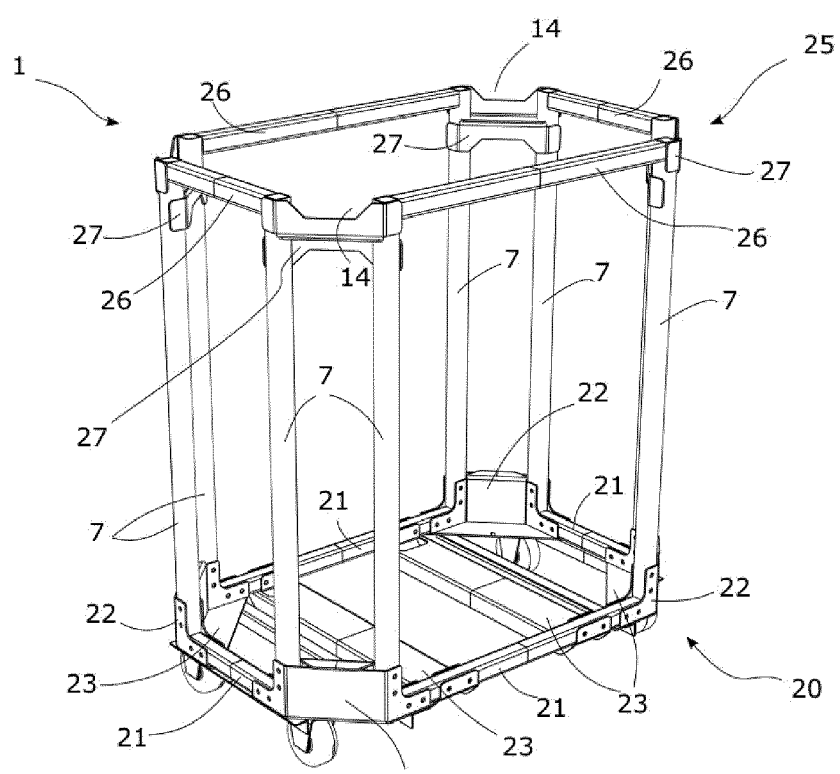
FIG. 2 This figure shows a rigid frame according to a preferred embodiment of the invention.

FIG. 2 shows the structure of the rigid frame (1) according to a preferred embodiment of the invention, comprising:

a lower set of frames (20) wherein each frame (21) connects to the subsequent, in a close manner, by a first connecting plate (22) which supports the beams (7) in each edge portion (2), and an upper set of frames (25) wherein each frame (26) connects to the subsequent, in a close manner, by a second connecting plate (27) which holds the beams (7) in each edge portion (2), the upper set of frames (25) is placed substantially parallel above the lower set of frames (20) at a distance according to the height of the beams (7). Preferably there are two beams (7) on each edge portion (2).

Additionally, the frames (21) of the lower set of frames (20) may comprise a first perimetral ridge (23) inwardly to the internal surface (8) of the container (10) suitable for supporting the assets contained. Said frames (21) may further comprise attaching points (not shown) for assuring the cargo does not move and/or comes off.

Also, the frames (26) of the upper set of frames (25) comprise a second perimetral ridge (not shown) inwardly to the internal surface (8) of the container (10). The second perimetral ridge is adapted for supporting the assets contained and the said frames (21, 26) and beams (7) may further comprise attaching points (not shown) for assuring the assets do not move and/or comes off from the container (10).

Additionally, said first (23) and second perimetral ridges may be arranged as a base and a roof plate, respectively. In this particular embodiment, the base plate is made of high strength material able to support the weight of the assets contained. In a particular embodiment, the first perimetral ridge (23) comprises several partitions some extending from one frame (21) to other (21), or the partition may be located only extending inwardly partially from the first connection plates (22), as it is shown in FIGS. 1 and 2.

Particularly, the frames (21, 26) of the lower (20) and/or upper (25) set of frames, and the beams (7) of the edge portions (2) may be hollow frames and/or hollow beams; or hollow frames and/or hollow beams filled in by light-weight materials.

Moreover, the first (22) and second (27) connecting plates joining the frames (21, 26) with the beams (7) may comprises a plurality of cross-sectional shapes and lengths or heights able to join the said frames (21, 26) and beams (7) when they have different sizes and cross-sections. Preferably, the joining between the frames (21, 26) and beams (7) with the first (22) and second (27) connecting plates are done by mechanical attachment means.

Additionally, all the structural elements comprising the rigid frame (1) may comprise a coating at least onto the external surface (9), configured to protect the material in maritime conditions.

Furthermore, the container (10) further comprises one or more access openings (14) on the external surface (9) of the container (10). Particularly, said access openings (14) are located on the external surface (9) of each of the second connecting plates (27) of the container (10) adjacent to each lifting eye (13). The access openings (14) are adapted for accessing the lifting eyes (13) from outside without the need of demounting the corner protectors (3) to hook the lifting eyes. By this way, a malicious act of manipulating the assets in order to operate the lifting eyes is thus avoided.

Corner Protectors (3)

Figure 3A:
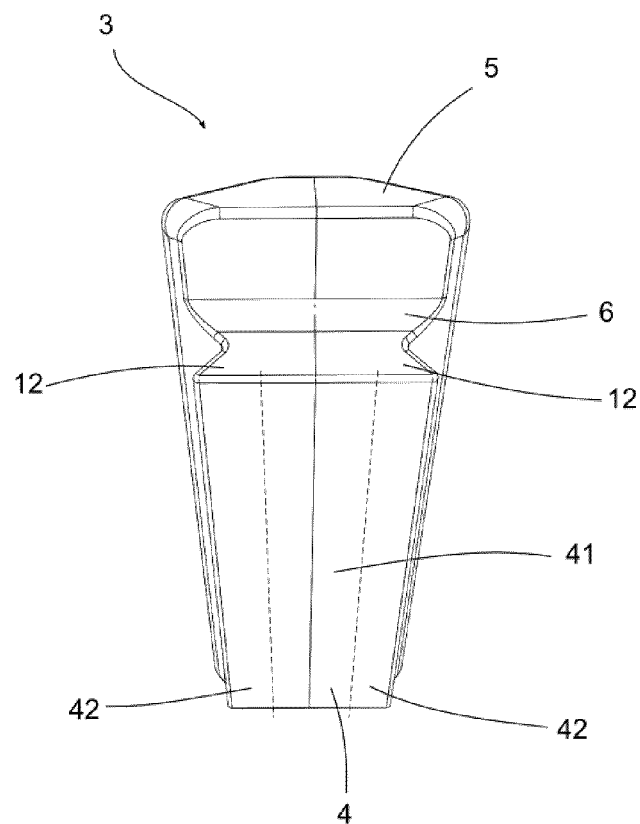
FIGS. 3a-3c These figures show different side-views of the corner protectors, particularly the rear view, the cross-sectional view and side view, respectively.

FIG. 3a shows a rear view of a particular embodiment of the corner protector (3). This view allows seeing a detailed part of the inner face (4) of the corner protector (3). The inner face (4) of the corner protectors (3) comprise a flange (6) adapted for fitting in the two beams (7). The inner face (4) comprises three sections: one inner section (41) in the middle of two substantially equal outer sections (42). Preferably, the flange (6) is arranged in the inner section (41) of the inner face (4).

Figure 4A:
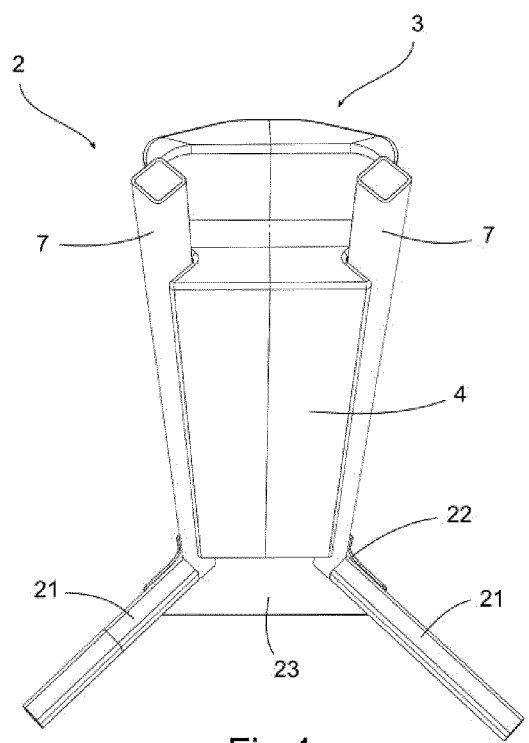
FIGS. 4a-4c These figures show different side-views of the corner protectors mounted on the edge portions according to a preferred embodiment, particularly the rear view, the upper view and front view, respectively.

The flange (6) further comprises two flange protrusions (12) protruding from the flange (6) inclined towards the outer sections (42) leaving a space for allocating the beams (7) in a manner the flange protrusions (12) self-lock on the beams (7) as can be seen in FIG. 4a. In this particular example, the flange protrusions (12) protrude divergently from the inner section (41) of the inner face (4) of the corner protectors (3).

Particularly, the middle space between flange protrusions (12) is filled out by an additional protrusion of the flange (6) in the inner section (41).

Figure 3B:
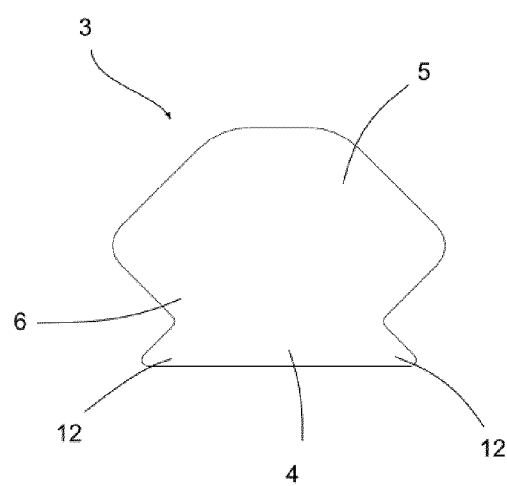

FIG. 3b shows a particular cross-sectional view of the corner protector (3) of FIG. 3a perpendicular to the longitudinal axis, being the longitudinal axis substantially parallel to the elongation of the corner protector (3).

Figure 3C:
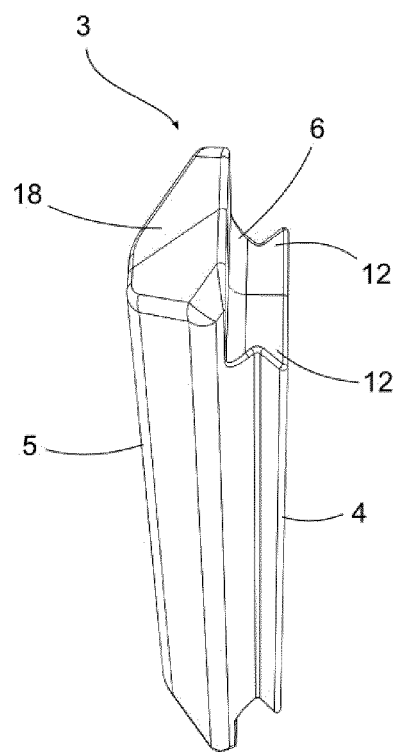

FIG. 3c shows a side view of the same corner protector (3) of FIGS. 3a and 3b. The outer face (5) of the corner protector (3) further comprises beveled ends (18) on the end closer to the top container face (11) and on the end closer to the bottom container face (11). In addition, the inner face (4) of the corner protector (3) further comprises recesses in both ends of the corner protector (3), i.e. without a flange (6) protruding from the inner face (4). Said recesses are configured to receive the first connecting plate (22) and the second connecting plate (27) in the corresponding end.

FIG. 4a shows the corner protector (3) of FIG. 3a, in the same position, mounted on the edge portions (2), and fitted in the beams (7) of the edge portions (2) by the flange (6).

Figure 4B:
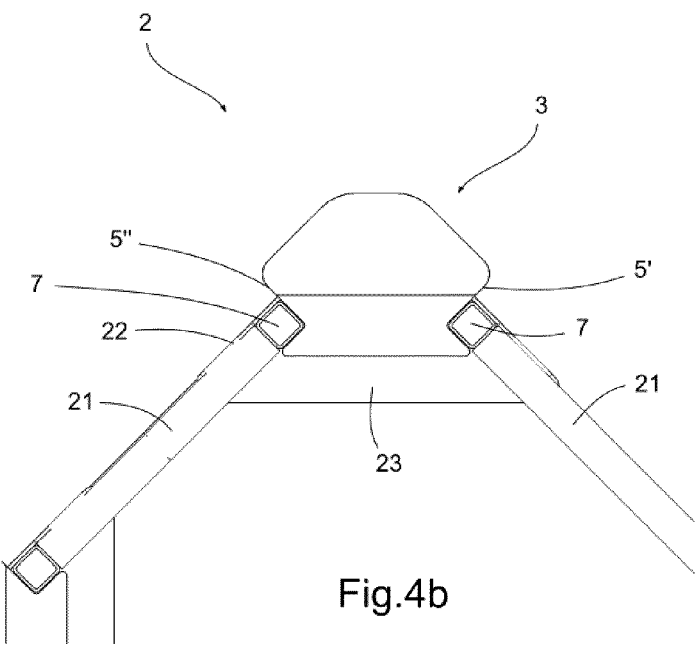

FIG. 4b shows the corner protector (3) of FIG. 3b, in the same position, mounted on the edge portions (2), and fitted in the beams (7) of the edge portions (2) by the flange (6). The flange protrusions (12) snagging on the beams (7) form the same cross-sectional shape of the beam (7). In the FIG. 4b, the cross-sectional shape of the beam (7) is square and therefore, the angle form between the flange (6) and the flange protrusion (12) is a right angle.

In this FIG. 4b can be seen that the corner protectors (3) comprise a substantially polygonal cross-section with two lateral sides (5', 5"). The lateral sides (5', 5") of the polygonal cross-section extend perpendicularly to each container side configured to form the edge portion (2); i.e. the lateral sides (5', 5") of the polygonal cross-section of the corner protector (3) are perpendicular to the frames (21). This allows maximize the space available within the container, more particularly when there is a modular configuration.

Figure 4C:
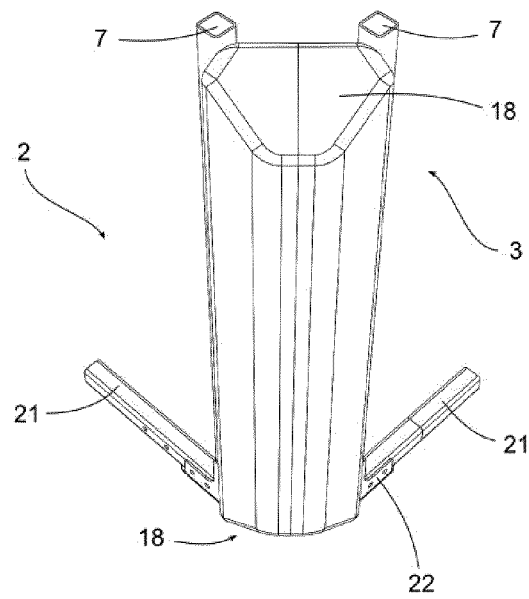

FIG. 4c shows the corner protector (3) mounted on the edge portions (2), and fitted in the beams (7) of the edge portions (2). It can be seen that outer face (5) of the corner protector (3) covers both beams (7) in the event that a diagonal impact of the container occurs. This allows a better protection and better load distribution from the corner protector (3) to the beams (7). Particularly, the outer face (5) extends in a manner embracing the said beams (7).

Additionally, FIG. 4c shows beveled ends (18) configure to avoid snagging with any interposed element when lifting up or hoisting the container by reducing the lateral top and bottom spaces of the container.

Additionally, in FIGS. 4a-4c it is shown a detail of the joining between the first connecting plate (22) with the frames (21) and beams (7). Moreover, a partition of the first perimetral ridge (23) extending inwardly from the first connecting plate (22) it is shown. The second connecting plate (27) is hidden in FIG. 4a, but the corresponding recess on the inner face (4) of the corner protector (3) is shown.

The inner face (4) of the corner protector (3) extends up to the top container face covering the access openings (14) from the lateral container sides.

Modular Configuration of the Container (1)

Figure 5:
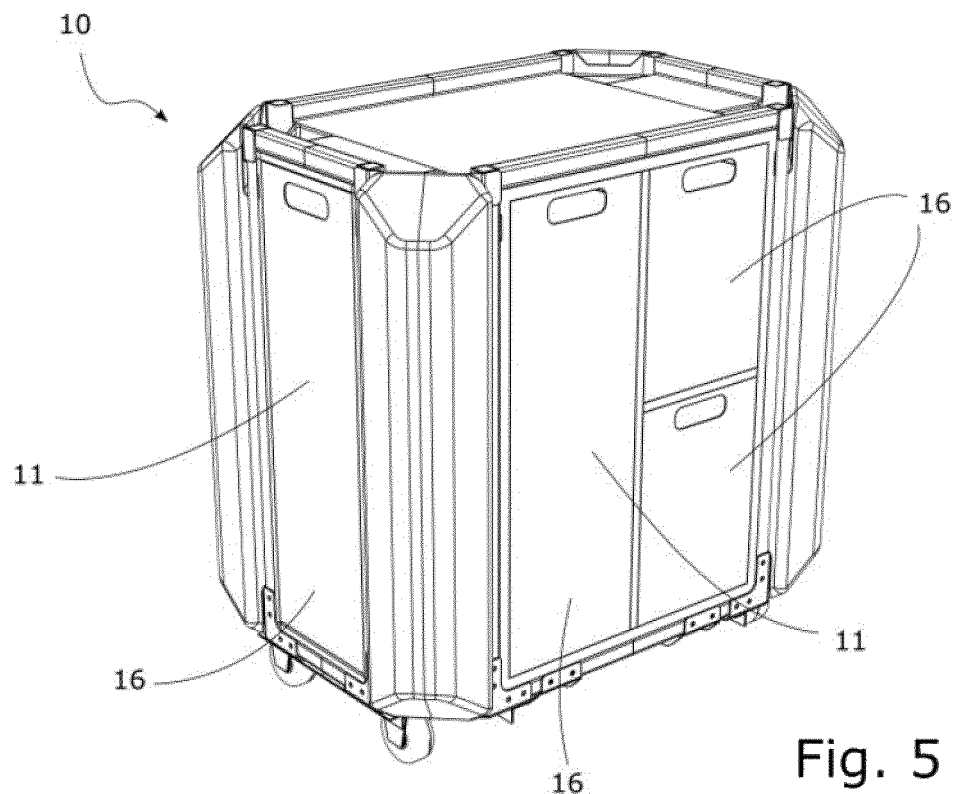
FIG. 5 This figure shows a particular configuration of the container comprising detachable or modular boxes.

FIG. 5 shows a container (10) comprising detachable or modular boxes (16) adapted to store items. Each box (16) is separated apart and accessible from outside of the container (10) by its own door. Each door comprises a handle to open and access to the interior of the container (10). Optionally, the boxes (16) are closed and are stored into separated compartments within the container (10). In this particular embodiment, a face of the box (16) forms integrally a fixed door; furthermore, said door may comprise a corresponding handle.

In addition, each module or box (16) may have its own purpose or target item storing such as tools, equipment or any other classified item. Each classification may be identified by a label marked on the door or container face (11). In a particular embodiment, a box (16) may be accessible from more than one container face (11). More particularly, the container (10) comprises a plurality of boxes (16).

Collapsible Lifting Point Anchor (17)

FIG. 6a shows a particular embodiment of the container (10) comprising a collapsible lifting point anchor (17), said collapsible lifting point anchor (17) being in the non-collapsed position. In this configuration, the collapsible lifting point anchor (17) is laid onto the top container face.

Preferably, the collapsible lifting point anchor (17) is joined to the container (10) by two diagonally spaced second connecting plates (27). Said joining may be made by mechanical attachment means configured to rotate between the non-collapsed position and the collapsed position.

FIG. 6b shows the same embodiment that FIG. 6a but the said collapsible lifting point anchor (17) being in the collapsed position. In this configuration, the collapsible lifting point anchor (17) is positioned perpendicularly to the top container face (11). Additionally, the collapsible lifting point anchor (17) may be joined by at least one locking element (17') to a remaining second connecting plate (27). This locking element (17') may be rigid or flexible.

As a reinforcement to support the change of weight to be supported, the second connecting plates joined to the collapsible lifting point anchor (17) further comprises an additional plate (28).

Preferably, the collapsible lifting point anchor (17) comprises an L-shaped bent rod attached to each end with a second connecting plate (27), and further comprising a hook in the bent portion configured to act as a lifting eye (13).

The invention claimed is:

1. A container adapted for cargo or personnel transport in marine operations, the container being substantially prismatic, cylindrical, or cubic in shape, wherein the container comprises:
    an internal surface and an external surface,
    a rigid frame, which defines a plurality of container faces, wherein the confluence of two or more of said container faces define edge portions, wherein one or more of the edge portions are substantially chamfered, and
    one or more shock absorbing corner protectors adapted for being mounted on the edge portions, wherein the corner protectors comprise an inner face and an outer face,
    wherein:
    the edge portions of the rigid frame comprise two beams arranged substantially in parallel to the direction of the confluence of two container faces, and
    the inner face of the corner protectors comprise at least a flange adapted for fitting in the two beams of the edge portions, such that the corner protectors substantially protrude from the external surface,
    the one or more shock absorbing corner protectors comprise an elastomeric material adapted for absorbing impact energy and distributing the associated impact stresses on the rigid frame, and a flexible foam core, wherein the flexible foam has shape memory,
    the flange of the corner protectors comprises two or more flange protrusions configured to self-lock the entire corner protector on the two beams, such that said flange protrusions protrude divergently from the flange so as to define a space for allocating the beams, the flange protrusions and the flange partially surrounding a cross-sectional shape of each of the two beams; and
    the thickest part of the corner protectors is oriented substantially perpendicular to the chamfered face of the edge portions.

2. The container according to claim 1, comprising two beams on one or more edge portions.

3. The container according to claim 1, wherein the container is substantially rectangular prismatic, comprising a top container face, a bottom container face and four side container faces.

4. The container according to claim 3, comprising four identical corner protectors, said four corner protectors being each positioned on one edge portion.

5. The container according to claim 1, wherein an angle formed by the flange protrusions and the inner face of the corner protectors is larger than 0° and smaller than 90°.

6. The container according to claim 1, wherein the corner protectors are substantially elongated.

7. The container according to claim 6, wherein the corner protectors comprise substantially beveled ends, adapted for avoiding the snagging on adjacent obstacles during hoisting or lowering.

8. The container according to claim 6, wherein the corner protectors comprise a substantially polygonal cross-section.

9. The container according to claim 8, wherein the sides of the polygonal cross-section of the corner protectors form angles which are larger than 0° and smaller than 180°.

10. The container according to claim 6, further comprising detachable or modular boxes adapted for storage of items.

11. The container according to claim 6, further comprising a collapsible lifting point anchor suitable for hoisting or lifting up the entire container by a single point when the collapsible lifting point anchor is positioned in the non-collapsed position.

* * * * *